United States Patent

Ohmori et al.

Patent Number: 4,665,144
Date of Patent: May 12, 1987

[54] MATERIAL FOR CONTACT LENSES

[75] Inventors: Akira Ohmori, Ibaraki; Nobuyuki Tomihashi, Takatsuki, both of Japan

[73] Assignee: Daikin Industries, Ltd., Osaka, Japan

[21] Appl. No.: 808,071

[22] Filed: Dec. 12, 1985

[30] Foreign Application Priority Data

Dec. 12, 1984 [JP] Japan .................. 59-261997
Dec. 26, 1984 [JP] Japan .................. 59-281566
Feb. 15, 1985 [JP] Japan .................. 60-28875

[51] Int. Cl.$^4$ .................... C08F 20/24
[52] U.S. Cl. .................... 526/245; 526/246; 523/106; 351/160 R
[58] Field of Search .................... 526/245, 246; 351/160 R, 160 H; 523/106

[56] References Cited

U.S. PATENT DOCUMENTS

| | | | |
|---|---|---|---|
| 3,457,247 | 7/1969 | Katsushima et al. | 526/245 |
| 3,542,461 | 11/1970 | Girard et al. | 351/160 |
| 3,950,315 | 4/1976 | Cleaver | 260/86.1 |
| 4,259,407 | 3/1981 | Tada et al. | 428/421 |
| 4,433,111 | 2/1984 | Tighe et al. | 525/326.2 |
| 4,440,918 | 4/1984 | Rice et al. | 526/246 |
| 4,493,910 | 1/1985 | Tighe et al. | 523/108 |

Primary Examiner—Paul R. Michl
Assistant Examiner—Peter D. Mulcahy
Attorney, Agent, or Firm—Larson and Taylor

[57] ABSTRACT

This invention provides a material for contact lenses comprising a polymer having 10 to 100 5 by weight of a structural unit represented by the formula

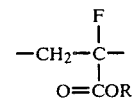

wherein R is $(CH_2)_l R^1$ or $-CH_2)_m(CF_2)_n CFZ^1 Z^2$ in which $R^1$ is oxygen-containing fluoroalkyl, $Z^1$ and $Z^2$ are the same or different and each hydrogen, fluorine or fluoroalkyl, l is an integer of 1 to 5, m is an integer of 1 to 4 and n is 0 or an integer of 1 to 10, 0 to 60% by weight of a structural unit represented by the formula

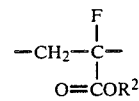

wherein $R^2$ is lower alkyl, and 0 to 80% by weight of a structural unit represented by the formula

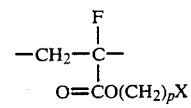

wherein X is hydroxyl or carboxyl and p is an integer of 1 to 5.

3 Claims, No Drawings

MATERIAL FOR CONTACT LENSES

This invention relates to a material for contact lenses.

In use, contact lenses remain attached to the eye for a long time, and thus those of the type least offensive to the eye are desirable. The offensiveness of contact lens is mainly due to the bulkiness of the contact lens and the lack of oxygen in the cornea caused by the low oxygen permeability of the contact lens.

Heretofore polymethyl methacrylate has been frequently used as a material for contact lenses, although poor in oxygen permeability and flexibility.

Japanese Unexamined Patent Publication No. 29660/1979 discloses the use of a fluoroalkyl methacrylate-hydroxyalkyl methacrylate copolymer as a material for contact lenses improved in these properties. However, the copolymer is too brittle in a dried state to permit machining and is insufficient in oxygen permeability.

Japanese Unexamined Patent Publication No. 127914/1983 describes a material for contact lenses comprising a polymer having perfluorooxyalkylene. The disclosed material for contact lenses, purportedly having an increased oxygen permeability, has a low glass transition temperature so that the lens made of the material can not retain its shape for a long term. In other words, the material must be made into great-size to prevent such transformation. Further the material is unsatisfactory in the transparency required of contact lenses.

It is an object of this invention to provide a material for contact lenses which has a great oxygen permeability, high flexibility and outstanding transparency and which can be formed into a small-size thin product less susceptible to distortion.

It is another object of the invention to provide a material for contact lenses which is not offensive to the eye.

Other objects and features of the invention will become apparent from the following description.

This invention provides materials for contact lenses comprising a polymer having a structural unit represented by the formula

wherein R is $-(CH_2)_l R^1$ or $-(CH_2)_m(CF_2)_n CFZ^1 Z^2$ in which $R^1$ is oxygen-containing fluoroalkyl, $Z^1$ and $Z^2$ are the same or different and each hydrogen, fluorine or fluoroalkyl, $l$ is an integer of 1 to 5, m is an integer of 1 to 4 and n is 0 or an integer of 1 to 10.

Our research reveals that the contact lenses which can be obtained from the polymer having the structural unit represented by the formula (1) can substantially achieve the objects of the invention. This invention has been accomplished based on this novel finding.

The oxygen-containing fluoroalkyl groups represented by $R^1$ in the formula expressing R in the formula (1) are preferably those having 1 to 10 carbon atoms. The fluoroalkyl groups represented by $Z^1$ and $Z^2$ are preferably those having 1 to 10 carbon atoms.

The oxygen-containing fluoroalkyl groups represented by $R^1$ in the polymer of the invention which has the structural unit of the formula (1) are preferably those represented by the formula

wherein k is 0 to 15, preferably 0 to 8, more preferably 0 or 1.

The polymer to be used as the material for contact lenses of the invention may contain a structural unit represented by the formula

wherein $R^2$ is lower alkyl having 1 to 10 carbon atoms and/or a structural unit represented by the formula

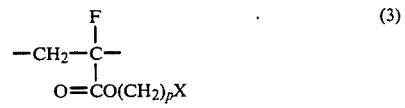

wherein X is hydroxyl or carboxyl and p is an integer of 1 to 5, in addition to the structural unit of the formula (1). In this case, the proportions of the structural units of the formulas (1) and (2) and/or (3) are about 10 to about 100% by weight of the structural unit of the formula (1), 0 to about 60% by weight of the structural unit of the formula (2) and 0 to about 80% by weight of the structural unit of the formula (3), based on the polymer. The structural unit of the formula (1) improves the oxygen permeability, stain resistance and flexibility of the lens to be formed; the structural unit of the formula (2) imparts suitable mechanical strength to the lens to be prepared although the excessive content renders the lens brittle; and the structural unit of the formula (3) gives hydrophilic property to the lens to be produced although the excessive content increases the coefficient of water absorption, thereby reducing the dimensional stability and the stain resistance of the lens.

The molecular weight of the polymer according to this invention as measured by gel permeation chromatography is usually in the range of about 100,000 to 1,000,000.

The polymer of the invention can be usually prepared by homopolymerizing a monomer represented by the formula

wherein R is as defined above, or by copolymerizing the monomer of the formula (a) with a monomer represented by the formula

wherein R² is as defined above and/or a monomer represented by the formula $$CH_2=\underset{O=CO(CH_2)_pX}{\overset{F}{C}}$$ (c)

wherein X and p are as defined above. The polymer may further contain other monomers such as methacrylates, acrylates, vinyl ethers, vinyl acetate, vinyl chloride, dimethacrylates, diacrylates, di-α-fluoroacrylates and like bifunctional monomers, etc. insofar as such monomers do not impair the properties of the polymer.

The polymer of the invention can be prepared by conventional methods for preparing fluorine-containing methacrylates, e.g. method disclosed in Japanese Unexamined Patent Publication No. 19350/1983.

The foregoing methods produce high molecular weight polymers which are tough and outstanding in mechanical strength when using a vinyl monomer having fluorine at the α position but give low molecular weight polymers in the form of grease when using a vinyl monomer having hydrogen or methyl at the α position because of its low polymerization rate.

Oxygen permeability coefficient:
The oxygen permeability coefficient was measured by the V method of ASTM D 1434 under the conditions given below:
Gas; a standard mixture of 79% by volume of nitrogen and 21% by volume of oxygen
Pressure; primary pressure of 5 kg/cm² and secondary pressure of 1 kg/cm² (absolute)
Amount of gas permeated; 4 cc
Testing time; time taken for gas to permeate (sec)
Area; 135 cm²
The composition of gas was analyzed by gas chromatography.
Refractive index: Measured by Abbe refractometer
Water absorption coefficient: Measured by the method of JIS K 6911
Rockwell hardness: Measured by the method of JIS K 7202

EXAMPLES 2 TO 8 AND COMPARISON EXAMPLES 1 TO 4

Polymers were prepared in the same manner as in Example 1 with the exception of using the monomers as shown below in Table 1 and were checked for the foregoing properties with the results also listed in Table 1.

TABLE 1

| | Monomer | | | Oxygen permeability | Refractive index | Water absorption | Rockwell |
|---|---|---|---|---|---|---|---|
| | (a) (wt %) | (b) (wt %) | (c) (wt %) | coefficient | ($n_D^{25}$) | coefficient | hardness |
| Ex. | | | | | | | |
| 1 | —CH₂CF₂CF₃ (100) | None | None | 8.5 | 1.366 | 0.00 | 75 |
| 2 | —CH₂CF₂CF₂H (100) | " | " | 6.8 | 1.397 | 0.00 | 61 |
| 3 | —CH₂(CF₂)₄H (100) | " | " | 31.5 | 1.376 | 0.00 | 16 |
| 4 | —CH₂CF₂CF₃ (80) | —CH₃ (20) | " | 6.8 | 1.389 | 0.25 | 80 |
| 5 | —CH₂CF₂CF₃ (50) | None | —CH₂CH₂OH (50) | 11.2 | 1.410 | 2.5 | 30 |
| 6 | —CH₂CF₂CF₂H (30) | " | —CH₂CH₂OH (70) | 13.8 | 1.427 | 3.8 | 16 |
| 7 | —CH₂CF(CF₃)₂ (100) | " | None | 9.1 | 1.362 | 0.00 | 87 |
| 8 | —(CH₂)₂(CF₂)₂H (100) | " | " | 17.2 | 1.405 | 0.01 | 53 |
| Comp. Ex. | | | | | | | |
| 1 | —CH₂CF₂CF₃ (100) | " | " | 3.7 | 1.392 | 0.08 | 31 |
| 2 | —CH₂CF₃ (100) | " | " | 1.2 | 1.415 | 0.09 | 47 |
| 3 | —CH₂CF₂CF₂H (100) | " | " | 2.5 | 1.421 | 0.16 | 35 |
| 4 | None | —CH₃ (100) | " | 0.02 | 1.490 | 2.0 | 90 |

This invention will be described below in more detail with reference to the following Examples and Comparison Examples.

EXAMPLE 1

A 100 g quantity of a monomer of the formula $$CH_2=\underset{\phantom{X}}{\overset{F}{C}}COOCH_2CF_2CF_3$$

was mixed with 1.3 g of dodecylmercaptan and 0.05 g of 2,2'-azobisisobutyronitrile. The mixture was placed in a 1 l separable flask and maintained in a stream of nitrogen at 65° C. for 3 hours to undergo polymerization. The reaction mixture was cooled to room temperature and maintained at 130° C. under a reduced pressure for 24 hours to become dried. The polymer thus obtained was crushed by a cutter mill to a particle size of 0.5 to 5 mm. The powder was made into a film 0.5 mm in thickness by compression molding at 240° C. The oxygen permeability coefficient, refractive index, water absorption coefficient and Rockwell hardness of the film obtained were measured by the following methods. Table 1 below shows the results.

Note:
(1) The unit of oxygen permeability coefficient is ×10⁻¹⁰ cc.cm/cm².sec.cmHg.
(2) Table 1 shows only R' and R" in the monomer of the formula $$\underset{COOR'}{\overset{CF=CH_2}{|}}$$

used in Examples and the monomer of the formula $$\underset{COOR''}{\overset{CH_3}{\underset{|}{\overset{|}{C=CH_2}}}}$$

used in Comparison Examples.

Shaped bodies having a diameter of 25 mm and a length of 100 mm were formed by compression molding each from the polymers obtained respectively in Example 1 and Comparison Example 1. The shaped bodies were cut by a cutting tool operated at a rake angle of 20°, cutting speed of 10 mm/min and cut depth of 0.1 mm. The shaped body formed from the polymer of Example 1 was found to have a smooth cut surface, whereas the shaped body from the polymer of Comparison Example 1 was irregularly surfaced or rough on the cut surface.

The breaking angle was measured by a Charpy impact tester. A specimen made of the polymer of Example 1 (50 mm × 13 mm × 5 mm) was 75° and one made of the polymer of Comparison Example 1 was as small as 50° in the breaking angle. The results reveal that the polymer of Example 1 was outstanding in toughness.

EXAMPLES 9 TO 11

A 30 g quantity of each monomer of the formula (a) listed below in Table 2, 0.03 g of azobisisobutyronitrile and 10 g of m-xylene hexafluoride were placed in a 500 ml separable flask and fully mixed. The mixture was maintained at 60° C. for 16 hours to undergo polymerization. The reaction mixture was cooled to room temperature and maintained at 80° C. under a reduced pressure for 24 hours to become dried.

A 15 g portion of the dried product obtained above was press-shaped at 100° C. under a pressure of 50 kg/cm²G by compression between the films of tetrafluoroethylene-hexafluoropropene copolymer (product of Daikin Industries Ltd., Japan, available under a trade name Neoflon FEP), producing a specimen 1 mm in thickness. The glass transition temperature and stain resistance of the specimen were measured by the following methods, and the refractive index and oxygen permeability coefficient thereof were measured by the same methods as defined above. Table 2 below shows the results.

Glass transition temperature:

The specimen (10 mg) was heated by a differential scanning calorimeter in an atmosphere of nitrogen, elevating the temperature at a rate of 20° C./min to determine the temperature at which the absorption of heat started.

Stain resistance:

The specimen (50 mm × 20 mm) was immersed for 72 hours in artificial tears comprising 98% by weight of deionized water, 0.5% by weight of 96-99% alubmin prepared from human blood and 1.5% by weight of sodium chloride. After washing, the specimen was checked for the degree of coloration by being immersed in a commercially available biuret reagent for 2 hours. The higher degree of coloration represents the greater extent of stain.

EXAMPLES 12 AND 13

The monomers of the formulas (a), (b) and (c) listed below in Table 2 were mixed with azobisisobutyronitrile in an amount of 0.1% by weight based on the monomers. The mixture was placed in a polymerization container comprising two glass plates and a spacer made of polyethylene and having a filling volume expressed in a diameter of 100 mm and a thickness of 1 mm in such manner as to prevent the formation of air bubble. The container was dipped in a hot water bath with the glass plates fixed with clips. The water in the bath was heated to a temperature of 70° C. The temperature was elevated from 20° C. at a rate of 5° C./hr. At the temperature, the mixture was allowed to stand for 14 hours. Then the container was introduced into a refrigerator to remove the reaction mixture from the glass plates due to the strain caused by cooling, giving a specimen. Two specimens thus obtained were checked for the same properties as those in the preceding Examples with the results as indicated below in Table 2.

COMPARISON EXAMPLES 5 TO 7

Specimens were prepared by the same procedure as in Example 10 with the exception of using, in place of the monomer used in Example 10, 30 g of methyl methacrylate in Comparison Example 5, 30 g of a monomer represented by the formula

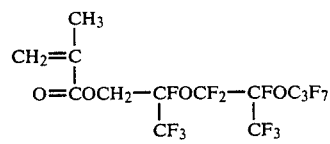

in Comparison Example 6 and 30 g of a monomer represented by the formula

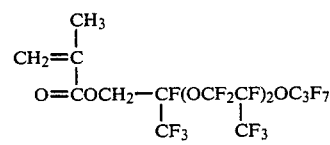

in Comparison example 7. The specimens thus obtained were tested for the same properties as those in the foregoing Examples. Table 2 below shows the results.

COMPARISON EXAMPLE 8

A specimen was prepared in the same manner as in Example 13 with the exception of using a mixture of 40% by weight of the same monomers as used in Comparison Example 7 and a monomer comprising 20% by weight of methyl methacrylate and 40% by weight of hydroxyethyl methacrylate in place of the monomers used in Example 13. The specimen thus obtained was tested for the same properties as those in the foregoing Examples. Table 2 below shows the results.

COMPARISON EXAMPLE 9

A commercially available contact lens made of silcone resin was checked for the same properties as those in the foregoing Examples with the results as shown below in Table 2.

EXAMPLE 14

A 10 g quantity of a monomer represented by the formula $CH_2=CFCOOCH_2CF_2O(CF_2CF_2O)_3(CF_2O)_5CF_2CH_2OOCCF=CH_2$ was placed in an ampoule of glass which was irradiated with ultraviolet light by an ultra-high voltage mercury lamp at 250 W (product of Ushio Inc. Japan, available under a trade name of USH 250 D) disposed at a distance of 10 cm away for 10 minutes. The polymer thus obtained was colorless, transparent and tough and in the form of resin.

COMPARISON EXAMPLE 10

A 10 g quantity of a monomer represented by the formula $CH_2=C(CH_3)COOCH_2CF_2O(CF_2CF_2O)_3(CF_2O)_5CF_2CH_2OOCC(CH_3)=CH_2$ was placed in an ampoule of glass which was irradiated with ultraviolet light by the same ultra-high voltage mercury lamp as used in Example 15 disposed at a distance of 10 cm away for 10 minutes, giving merely a product as grease.

A 0.5 part quantity by weight of diethoxyacetophenone was added to the grease and fully mixed therewith but was unable to dissolve in the grease, remaining as dispersed therein.

The mixture was introduced into an ampoule of glass which was irradiated with ultraviolet light to give a product as a resin. The product, however, was partly cloudy, i.e. not colorless nor transparent.

wherein R is $-(CH_2)_lR^1$ or $-(CH_2)_m(CF_2)_nCFZ^1Z^2$ in which $R^1$ is oxygen-containing fluoroalkyl represented by the formula

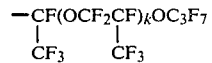

TABLE 2

|   | Monomer (a) | | | Monomer (b) | | Monomer (c) | | | Glass transition temp. (°C.) | Refractive index ($n_D^{25}$) | Oxygen permeability coefficient | Stain resistance |
|---|---|---|---|---|---|---|---|---|---|---|---|---|
|   | m | n | wt % | $R^2$ | wt % | p | X | wt % | | | | |
| Ex. | | | | | | | | | | | | |
| 9 | 1 | 0 | 100 | — | None | — | — | None | 74 | 1.341 | 65 | A |
| 10 | " | 1 | " | " | " | " | " | " | 53 | 1.332 | 80 | A |
| 11 | " | 2 | " | " | " | " | " | " | 38 | 1.323 | 130 | A |
| 12 | " | 1 | 40 | $CH_3$ | 20 | 4 | OH | 40 | 77 | 1.400 | 12 | A |
| 13 | " | 2 | " | " | " | " | " | " | 68 | 1.395 | 18 | A |
| Comp. Ex. | | | | | | | | | | | | |
| 5 | | | | As described above | | | | | 105 | 1.490 | 0.02 | B |
| 6 | | | | " | | | | | −7 | 1.342 | 45 | A |
| 7 | | | | " | | | | | −40 | 1.334 | 62 | A |
| 8 | | | | " | | | | | 14 | 1.415 | 9.5 | B |
| 9 | | | | Commercial contact lens of silicone resin | | | | | −120 | 1.405 | 150 | C |

Note:
(1) Table 2 shows only m, n, $R^2$, p and X in the monomers of the formulas (a), (b) and (c).
(2) The unit of oxygen permeability coefficient is $\times 10^{-10}$ cc · cm/cm² · sec · cmHg.
(3) Under the column of stain resistance, the letter A means that the specimen is not colored, the letter B that the specimen is slightly colored in its entirety, and the letter C that the specimen is thickly colored in its entirety.

Since the materials for contact lenses of this invention have a glass transition temperature higher than the body temperature, the contact lens made of the material, applied to the eye, exhibits a high hardness. Also the materials for contact lenses of the invention are higher in oxygen permeability, toughness, processability and resistance to stains than conventional materials as apparent from the forefoing Examples and Comparison Examples. The materials of the invention are also advantageous in having a refractive index substantially equal to that of tears (1.336) and a higher transparency than conventional polymers of the similar type which tranparency is imparted by a catalyst.

We claim:

1. A contact lense comprising a polymer having 10 to 100% by weight of a structural unit represented by the formula

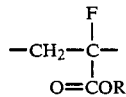

wherein k is 0 or an integer of 1 to 15, $Z^1$ and $Z^2$ are the same or different and each hydrogen, fluorine or fluoroalkyl having 1-10 carbon atoms, l is an integer of 1 to 5, m is an integer of 1 to 4 and n is 0 or an integer of 1 to 10, 0 to 60% by weight of a structural unit represented by the formula

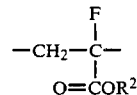

wherein $R^2$ is lower alkyl, and 0 to 80% by weight of a structural unit represented by the formula

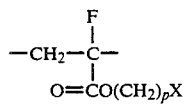

wherein X is hydroxyl or carboxyl and p is an integer of 1 to 5.

2. A contact lens as defined in claim 1 wherein k is 0.
3. A contact lens as defined in claim 1 wherein k is 1.

* * * * *